(12) United States Patent
Unger et al.

(10) Patent No.: US 7,915,980 B2
(45) Date of Patent: Mar. 29, 2011

(54) COAX CORE INSULATOR WAVEGUIDE

(75) Inventors: Robert Allan Unger, El Cajon, CA (US); Robert L. Hardacker, Escondido, CA (US); Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 150 days.

(21) Appl. No.: 12/380,739

(22) Filed: Mar. 3, 2009

(65) Prior Publication Data

US 2010/0225426 A1 Sep. 9, 2010

(51) Int. Cl.
*H01P 3/06* (2006.01)
(52) U.S. Cl. ......... 333/236; 333/243; 333/242; 333/245
(58) Field of Classification Search .................. 333/236, 333/239, 243, 245, 248, 242, 254, 260
See application file for complete search history.

(56) References Cited

U.S. PATENT DOCUMENTS

| | | | |
|---|---|---|---|
| 5,467,384 A | 11/1995 | Skinner, Sr. | |
| 6,724,282 B2 * | 4/2004 | Kao | ............... 333/243 |
| 2008/0036558 A1 | 2/2008 | Suarez-Gartner et al. | |

OTHER PUBLICATIONS

"Slot Line on a Dielectric Substrate," Seymour B. Cohn, IEEE Trans. Microwave Theory and Techniques, vol. MTT-17, No. 10, pp. 768-778, Oct. 1969.

* cited by examiner

*Primary Examiner* — Stephen E Jones
(74) *Attorney, Agent, or Firm* — Miller Patent Services; Jerry A. Miller

(57) ABSTRACT

A communication device consistent with certain implementations has a coaxial cable having length and first and second ends. The coaxial cable further has a central conductor, a dielectric insulator surrounding the central conductor, and an electric shield conductor surrounding the dielectric insulator. The dielectric insulator serves as a dielectric waveguide having a characteristic impedance Z at an operating frequency range. A termination for electrical energy coupled into or out of the dielectric insulator at approximately the characteristic impedance Z at the operating frequency range to utilize the dielectric insulator as a waveguide for transmission of signals along the length of the coaxial cable, and wherein the center conductor is further used to communicate an electrical signal between the first and second ends. This abstract is not to be considered limiting, since other embodiments may deviate from the features described in this abstract.

28 Claims, 4 Drawing Sheets

COAX CORE INSULATOR WAVEGUIDE

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

High bit rate data transmission is a frequent goal of modern electronic systems such as digital televisions. This must generally be achieved at low cost and with low emissions. This has been done with multiple wires in parallel but length and emissions are a limiting factor. Optical solutions are not cost effective at this point. Free air wireless solutions have merit, but typically require substantial power.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 2:
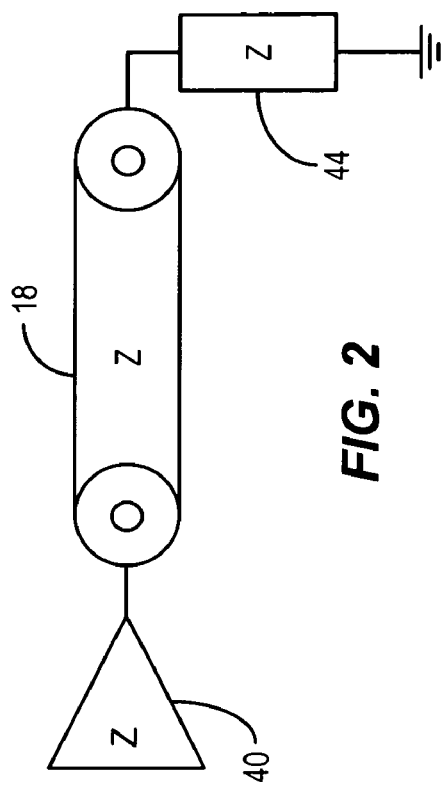
FIG. 2 illustrates the dielectric layer in use as a cylindrical dielectric waveguide in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of interpretation of this document, the term "coaxial cable" or "coax" is a cable having an inner conductor, surrounded by a tubular insulating dielectric layer which is then surrounded by another conductive layer. Generally, this conductive layer is further surrounded by an outer insulator. Such cables are commercially used as transmission lines that carry radio frequency or other frequency range electrical signals. Coaxial cables consistent with use herein can be either commercially available cables or cables of custom design, depending upon the particular implementation.

Figure 1:
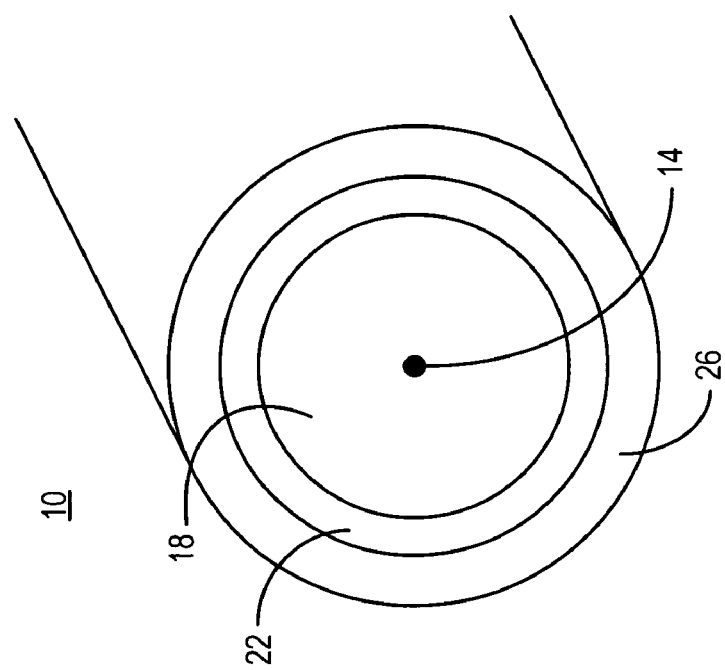
FIG. 1 illustrates the structure of a coaxial cable as is used in a manner consistent with certain embodiments of the present invention.

A coaxial cable structure is depicted in FIG. 1 as an end view of a coaxial cable 10. The coaxial cable structure shown has an inner conductor 14 that can be solid or stranded surrounded by the tubular insulating dielectric layer 18 that serves as the electromagnetic waveguide as described herein. The dielectric layer 18 is surrounded by a conductive layer 22 that may be formed using foil, braided wire, wire strands or combinations thereof. Finally, most commonly an outer insulator or jacket 26 is generally provided for protection of the conductive layer 22.

As noted earlier, high bit rate data transmission is a frequent goal of modern electronic systems such as digital televisions. It is generally desirable to achieve this at low cost and with low emissions. This has been done with multiple wires in parallel but length and emissions are a limiting factor. Optical solutions are not cost effective at this point. Free air wireless solutions have merit, but typically require greater power than a wave-guided wireless solution.

Certain implementations consistent with this invention use the tubular insulating dielectric layer 18 of the coaxial cable as a waveguide (resembling a donut cross sectional dielectric rod waveguide having metal boundaries at the inside and outside of the waveguide's donut cross section) for high bit rate RF transmission for example in the mmWave region of the electromagnetic spectrum. The conductive elements of the coaxial cable (14 and 18) can simultaneously be used in a conventional manner to provide lower data rate transmission functions as well as DC or AC power signals.

Performance of the cylindrical dielectric layer 18 as a waveguide is dependent upon the dielectric constant, the geometry of the dielectric layer and any bends in the cable 10. As with any waveguide, if the dielectric constant of the waveguide can be assumed constant over all frequencies of interest, the signals will pass from end to end if the waveguide is properly terminated at the characteristic impedance of the waveguide. In this case, the conductor 14 and the conductive shield 22 bound the waveguide along its length so as to produce a donut shaped cross section and an overall cylindrical shape rather than the shape of a dielectric rod. So, the electric field has a value of zero at the cylinder's outer and inner surfaces. Hence the transmission down the dielectric layer is bounded by the zero electric fields at these inner and outer surfaces and can be modeled as and will behave as any other waveguide subject to these geometric and zero field boundary constraints.

So, referring to FIG. 2, with respect to use of the cylindrical dielectric layer 18 as a waveguide, the source 40 driving the waveguide should suitably match the characteristic impedance Z of the waveguide 18 over the frequency range of interest, as should the load 44 within acceptable deviations for the particular application at hand so as to avoid standing waves and provide efficient transfer of energy from source 40 to load 44. In this case, either the source or sink for the electrical energy is coupled at a termination point of the waveguide at the characteristic impedance.

Figure 3:
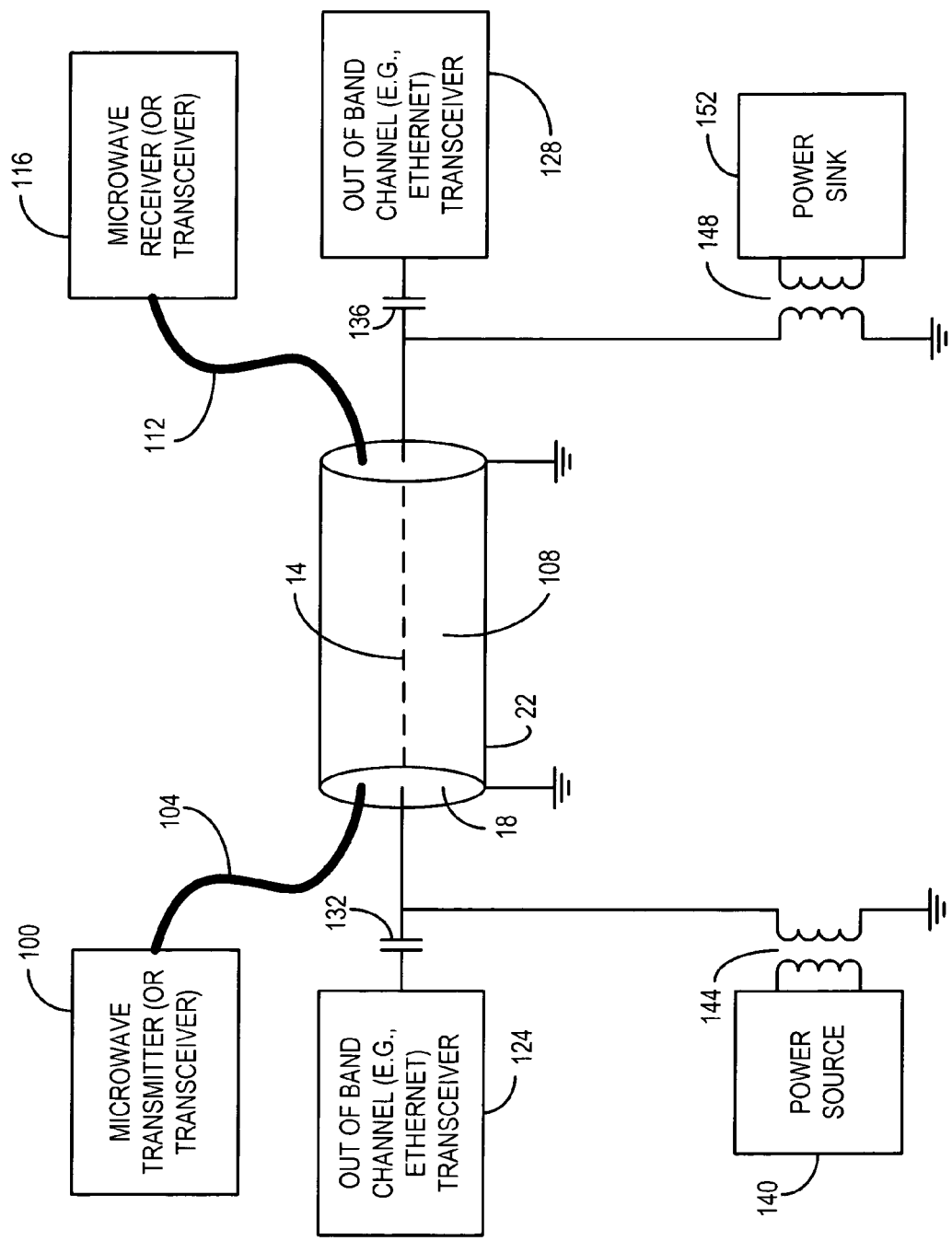
FIG. 3 is an example implementation using the coaxial cable as a waveguide as well as using other communication modes in a manner consistent with certain embodiments of the present invention.

Implementation examples described herein take advantage of the ability of certain electrically insulating materials to act as a waveguide for radio frequency (RF) transmission. Here what structurally looks like a conventional coaxial electrical cable (coax) can serve double or triple duty—for example, high bit rate data carriage, power supply transmission and low bit rate control transmission. An example application is shown in FIG. 3. In this example, the dielectric layer 18 of a conventional coaxial cable is used as a millimeter (mm) Wave waveguide, while providing data communication using traditional means for coax utilization, and power delivery. In this case, a microwave transmitter 100 feeds its transmitted power (e.g., at mm wave frequencies generated directly at a CMOS circuit) via a waveguide 104 that couples power through the dielectric layer 18 of a coaxial cable that serves as a waveguide 108. At the receiving end, the mm wave energy is received by a waveguide 112 to a microwave receiver 116. Coupling can be direct or via a directional coupler structure or other interconnection structure that preferably provides a good match to the characteristic impedance of the waveguide at each end for a continuous flow of microwave energy with minimal loss and minimal standing waves at frequencies of interest.

It should be noted that the example shown in FIG. 2 depicts a transmitter 100 and receiver 116, but in other embodiments, the communication can be two way, in which case both elements 100 and 116 can be considered transceivers (combination transmitters and receivers.

It should be noted that the communication via the coaxial cable's dielectric insulator serving as a waveguide may be at very high data rates that can be delivered on top of data that are delivered in a more or less conventional manner using the coax. In this illustration, an out-of-band (OOB) communication channel can utilize the conventional coaxial communication link to form, for example, an Ethernet communication channel. This is accomplished by coupling the channel to the center conductor 14. As illustrated, a pair of transceivers 124 and 128 can be used over this conventional medium. In this example, the transceivers 124 and 128 are shown coupled using coupling capacitors 132 and 136, but other isolation techniques can be used. DC and or AC power can further be piggy-backed onto the system between the center conductor and the grounded shield 22. In this case, an AC power source 140 (e.g., at 400 Hz) is coupled through an isolation transformer 144 to supply a readily rectified and isolated power signal between the center conductor 14 and ground. This power signal is then received through transformer 148 at a power sink 152 where it may be converted to DC for use in powering a device at the receiving side.

In one practical example of a high bit-rate application, a coaxial cable can be used to communicate video, control and power to a display. In this example, uncompressed high definition (HD) video can be transmitted at 100 using mmWave technology using the coaxial cable's cylindrical dielectric insulator 18 as a waveguide. The mmWave signal is demodulated at the receiving end at 116 and used, in this example, to provide high bandwidth video data to a display panel. Power is transformer coupled into the conductive center 14 of the coax from source 140 through transformer 144 to provide the energy necessary to illuminate a display's backlight and/or other display panel circuitry after receipt at transformer 148 and power sink 152 (where conversion to a useful AC or DC voltage and current takes place. In one example implementation, the AC from power source 140 can be at approximately 400 Hz for easy transmission and rectification, but this should not be considered limiting.

The OOB channel can be used as a control/status channel which is carried over the conductor using a technology such as Ethernet over coax, although any suitable scheme could be implemented using the conventional communication capabilities of the coax cable.

Coax cable used in a conventional manner can support bandwidths exceeding approximately 2-3 GHz depending upon cost and distance using traditional coupling methods. Simple high pass filters can isolate their "low-bit rate" transmission coupled into the coax with known, understood methods that can provide either a uni- or bi-directional communication channel while supporting the mmWave communication coupled into the core insulation which acts as a waveguide for the mmWave frequencies.

Because of the varying bandwidths available by selecting differing coax cable materials, it will be apparent upon consideration of the present teachings that multiple channels of communication can co-exist simultaneously on the coax dependent upon the implementation complexity which could allocate differing frequencies as a means of coexistence. While it is generally preferred to use off-the-shelf coaxial cable, custom core materials may be used to minimize losses over distance or otherwise optimize communication.

The OOB back channel of this example can be used for lower bandwidth video as might be used for a video conferencing camera or surveillance camera. Higher capacity OOB back channels could be implemented using an additional 60 GHz system sharing the same coax as a waveguide. Other implementation variations might include using other parts of the coax structure as the waveguide.

Those skilled in the art will appreciate that there are many devices such as probes, loops or slots that are conventionally used to inject or remove energy into or out of a waveguide. Any such technique which serves this purpose is suitable for application to implementations consistent with the present invention.

Figure 4:
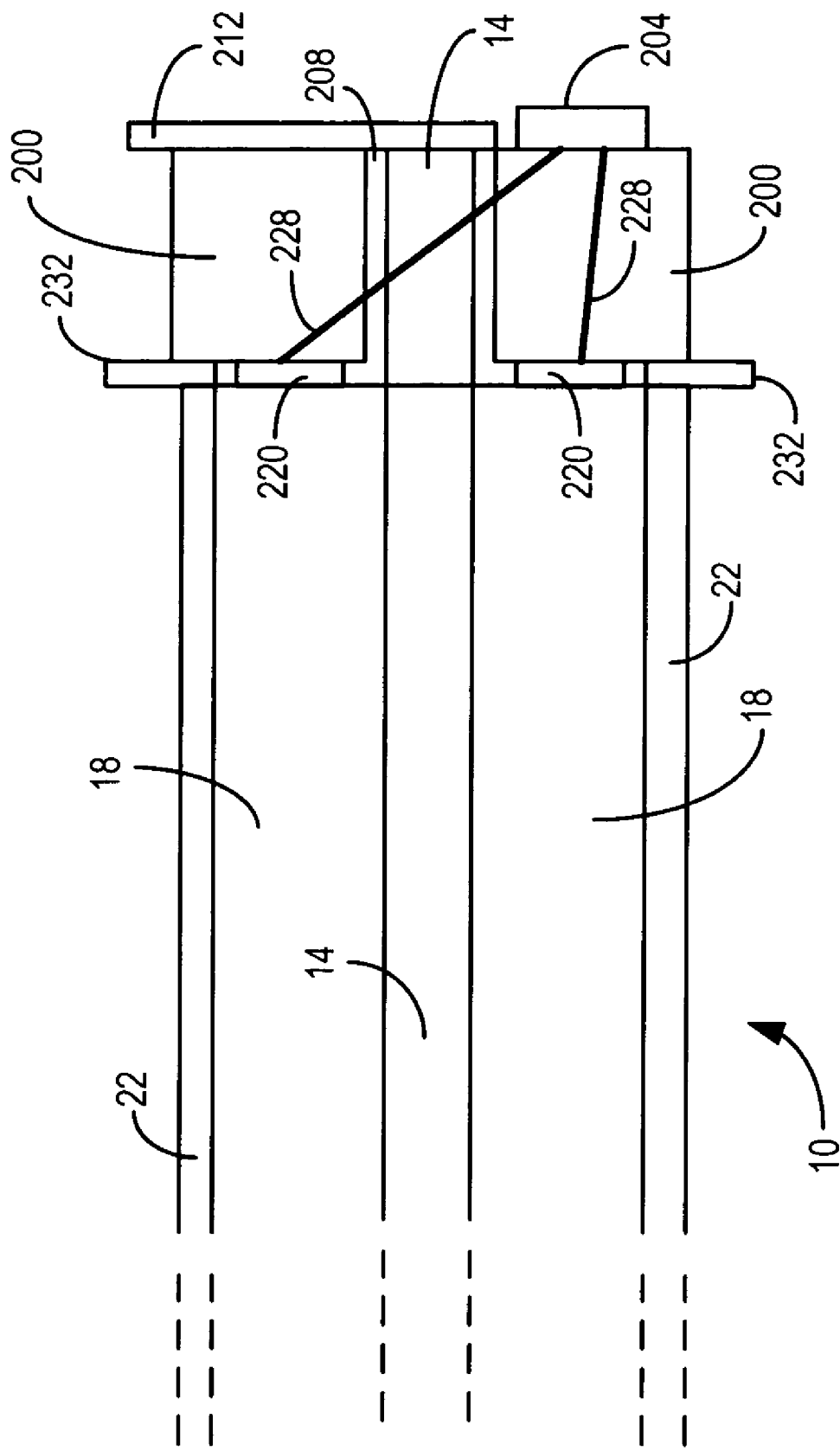
FIG. 4 is an example implementation that interfaces the coaxial cable with a substrate in a manner consistent with certain embodiments of the present invention.

Referring now to FIG. 4, by way of example, and not limitation, a ceramic substrate 200 (or suitable microwave dielectric) could be used as an interface between the coax 10 and an integrated circuit die 204 such as a CMOS transmitter or receiver die. A laser can be used to drill holes such as 208 (shown oversized for ease of illustration) in the ceramic material 200 while the ceramic is still green. After firing, conductive material (not shown) can be infused into the tubes 208 left as a result of the drilling.

The center conductor 14 of the coaxial cable can be contacted by the conductive material in the tubes 208 and any associated conductors (depicted in the figure as 212). On one end a conductive "antenna pad" 220 is provided (for example in a donut shape or as an array of pads) that contacts the insulating layer 18 of the coax in order to couple mm wave energy into or out of the waveguide formed by the insulating layer 18 (note that the outer jacket of the coax is not shown in this illustration for clarity). At the other side of the substrate 200, an interconnection to a receiver or transmitter device such as one in the form of a flip-chip mounted circuit element such as a CMOS die can be provided with connections made via traces depicted schematically as 228.

A larger hole through the substrate 200 could also be used to pass the coaxial center conductor. Other traces on the substrate could be used to get baseband and control data to/from the die. As part of manufacturing the center conductor would be pulled through the substrate to assure good contact between the coax 10 (electrical) dielectric and the antenna surfaces. Soldering the center wire 14 could also be used to clinch the mechanical connection. Heat from the process might also help embed the antenna pads 220 into the coax dielectric to provide for injection of the energy into the dielectric. Contacts 232 can be used to connect to the conductive sleeve 22. Similar or other coupling arrangements can be used at the other end of the waveguide.

Figure 5:
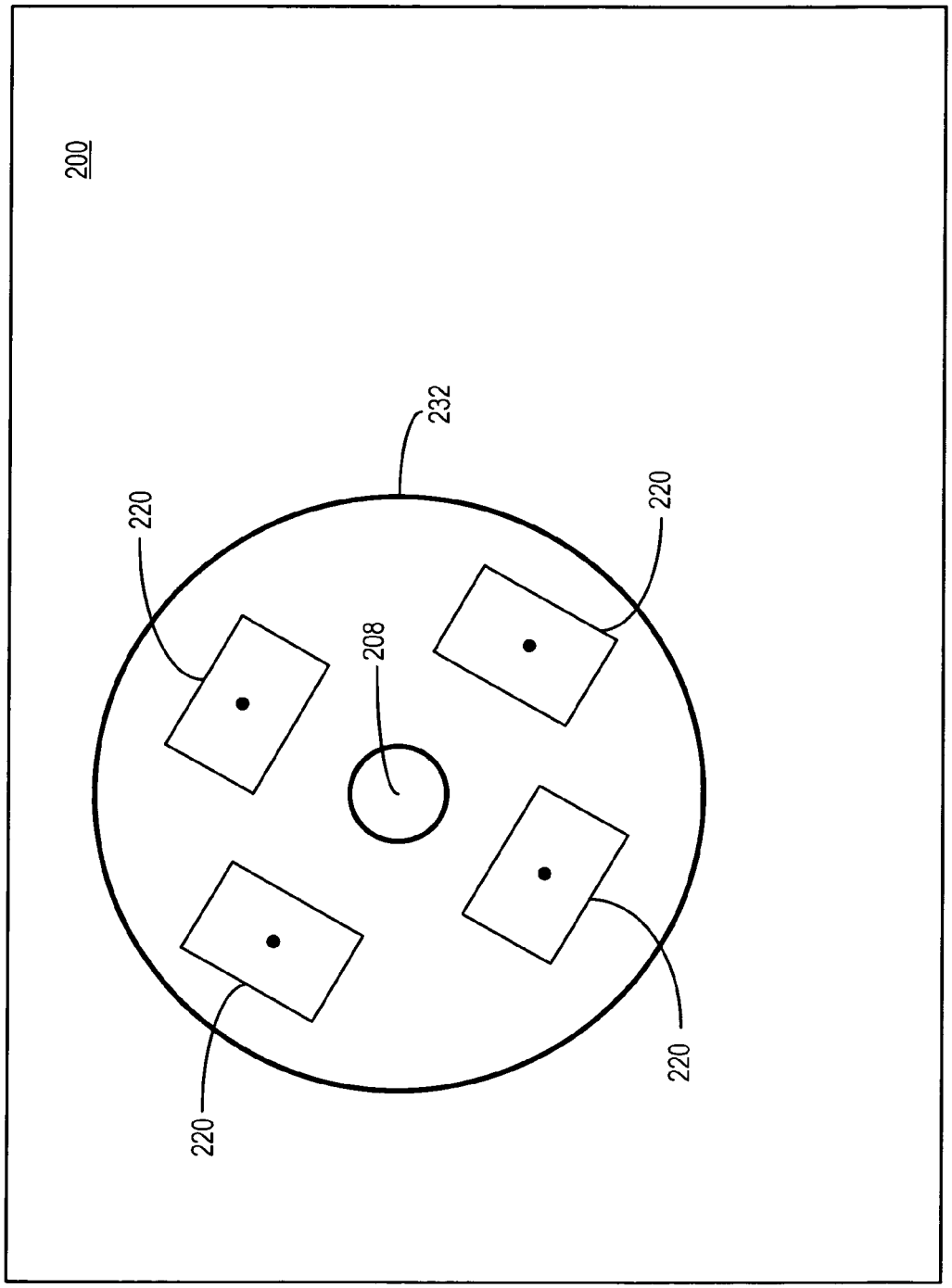
FIG. 5 shows one implementation example of the surface of the substrate that interfaces with the coaxial cable in a manner consistent with certain embodiments of the present invention.

An example of the substrate surface that accepts the coaxial cable is depicted in FIG. 5. In this example, an array of pads 220 couple energy to the dielectric of the coax, and hole 208 accepts the center conductor of the coax. Trace 232 contacts the shield of the coax and can be soldered in place using tabs or other structures not shown. The geometry and electrical characteristics of the interface can be adjusted to provide for a smooth transition or matching of characteristic impedance at the frequency range of interest, as will be apparent to those skilled in the art upon consideration of the present teachings.

In experiments conducted on conventional coaxial cables, it was confirmed that the dielectric could indeed serve as a waveguide. In such experiments, mm wavelength energy was injected into the coaxial cable's dielectric member by placing the cable in contact with a suitably sized waveguide. A similar interface was provided at each end to confirm that energy delivered to the dielectric was delivered to the other end of the waveguide.

Thus, in accord with certain implementations consistent with the present invention, a communication device has a coaxial cable having length and first and second ends. The coaxial cable further has a central conductor, a dielectric insulator surrounding the central conductor, and an electric shield conductor surrounding the dielectric insulator. The dielectric insulator serves as a dielectric waveguide having a characteristic impedance Z at an operating frequency range. A termination is provided terminating electrical energy coupled into or out of the dielectric insulator at approximately the characteristic impedance Z at the operating frequency range to utilize the dielectric insulator as a waveguide for transmission of signals along the length of the coaxial cable, wherein the center conductor is further used to communicate an electrical signal between the first and second ends.

In certain implementations, the termination comprises a transmitter termination at the first end of the coaxial cable that receives transmitted signals from a transmitter for transmission over the dielectric insulator acting as a waveguide. In certain implementations, the termination has a receiver termination at the second end of the coaxial cable that delivers transmitted signals from the transmitter to a receiver over the dielectric insulator acting as a waveguide. In certain implementations, a transmitter is coupled to the center conductor that simultaneously transmits signals to a receiver at the operating frequency range of the coaxial cable using the coaxial cable as a conventional coaxial transmission medium. In certain implementations, the termination has a receiver termination at the second end of the coaxial cable that delivers transmitted signals to a receiver, where such transmitted signals are transmitted over the dielectric insulator acting as a waveguide. Certain implementations, further include a transmitter coupled to the center conductor that simultaneously transmits signals to a receiver at the operating frequency range of the coaxial cable using the coaxial cable as a conventional coaxial transmission medium. In certain implementations, the termination comprises one or more conductive pads that contact the dielectric insulator of the coaxial cable, wherein energy is passed to or from the one or more conductive pads to provide an interface for use of the coaxial cable's dielectric insulator as a waveguide. In certain implementations, the conductive pads are formed on the surface of an insulating substrate, and wherein the substrate provides a contact for connecting to the coaxial cable's electric shield and central conductor. Certain implementations further include a circuit residing on the substrate that transmits or receives the energy from the dielectric insulator serving as a waveguide. In certain implementations, the circuit resides on a flip chip mounted to the substrate. Certain implementations, further include a transceiver circuit residing on the substrate that transmits and receives energy to and from the dielectric insulator serving as a waveguide. In certain implementations, the circuit resides on a flip chip mounted to the substrate.

Another communication device consistent with certain implementations has a coaxial cable having length and first and second ends. The coaxial cable further has a central conductor, a dielectric insulator surrounding the central conductor, and an electric shield conductor surrounding the dielectric insulator. The dielectric insulator serves as a dielectric waveguide having a characteristic impedance Z at an operating frequency range. A termination terminates electrical energy coupled into or out of the dielectric insulator at approximately the characteristic impedance Z at the operating frequency range to utilize the dielectric insulator as a waveguide for transmission of signals along the length of the coaxial cable, wherein the center conductor is further used to communicate an electrical signal between the first and second ends.

In certain implementations, the termination has a transmitter termination at the first end of the coaxial cable that receives transmitted signals from a transmitter for transmission over the dielectric insulator acting as a waveguide, and the termination has a receiver termination at the second end of the coaxial cable that delivers transmitted signals from the transmitter to a receiver over the dielectric insulator acting as a waveguide. In certain implementations, a transmitter is coupled to the center conductor that simultaneously transmits signals to a receiver at the operating frequency range of the coaxial cable using the coaxial cable as a conventional coaxial transmission medium. In certain implementations, the termination has one or more conductive pads that contact the dielectric insulator of the coaxial cable, wherein energy is passed to or from the one or more conductive pads to provide an interface for use of the coaxial cable's dielectric insulator as a waveguide; and the conductive pads are formed on the surface of an insulating substrate, wherein the substrate provides a contact for connecting to the coaxial cable's electric shield and central conductor. Certain implementations further have a circuit residing on the substrate that transmits or receives the energy from the dielectric insulator serving as a waveguide.

Another communication device consistent with certain implementations has a coaxial cable having length and first and second ends. The coaxial cable further has a central conductor, a dielectric insulator surrounding the central conductor, and an electric shield conductor surrounding the dielectric insulator. The dielectric insulator serves as a dielectric waveguide having a characteristic impedance Z at an operating frequency range. A termination terminates electrical energy coupled into or out of the dielectric insulator at approximately the characteristic impedance Z at the operating frequency range to utilize the dielectric insulator as a waveguide for transmission of signals along the length of the coaxial cable. The termination has a transceiver termination at the first end of the coaxial cable that receives transmitted signals from a transmitter for transmission over the dielectric insulator acting as a waveguide and transmits signals over the dielectric insulator acting as a waveguide, wherein the center conductor is further used to communicate an electrical signal between the first and second ends.

Certain implementations further have a transmitter coupled to the center conductor that simultaneously transmits signals to a receiver at the operating frequency range of the coaxial cable using the coaxial cable as a conventional coaxial transmission medium. In certain implementations, the termination has a receiver termination at the second end of the coaxial cable that delivers transmitted signals to a receiver, where such transmitted signals are transmitted over the dielectric insulator acting as a waveguide.

In the examples described above, the coaxial cable illustrated is round in cross section so that the dielectric layer 18 is cylindrical, but those skilled in the art will appreciate upon consideration of the present teachings that the dielectric layer need not be cylindrical, but could be oval, octagonal or any other suitable cross sectional shape without limitation so long as it forms a part of a coaxial cable structure.

While certain illustrative embodiments have been described, it is evident that many alternatives, modifications, permutations and variations will become apparent to those skilled in the art in light of the foregoing description.

What is claimed is:

1. A communication device, comprising:
   a coaxial cable having length and first and second ends;
   the coaxial cable further having a central conductor, a dielectric insulator surrounding the central conductor, and an electric shield conductor surrounding the dielectric insulator;
   the dielectric insulator serving as a dielectric waveguide having a characteristic impedance Z at an operating frequency range;
   a termination for electrical energy coupled into or out of the dielectric insulator at approximately the characteristic impedance Z at the operating frequency range to utilize the dielectric insulator as a waveguide for transmission of signals along the length of the coaxial cable; and
   wherein the central conductor is further used to communicate an electrical signal between the first and second ends; and
   wherein the termination comprises one or more conductive pads that contact the dielectric insulator of the coaxial cable, wherein energy is passed to or from the one or more conductive pads to provide an interface for use of the coaxial cable's dielectric insulator as a waveguide.

2. The communication device according to claim 1, wherein the conductive pads are formed on the surface of an insulating substrate, and wherein the substrate provides a contact for connecting to the coaxial cable's electric shield and central conductor.

3. The communication device according to claim 1, further comprising a circuit residing on the substrate that transmits or receives the energy from the dielectric insulator serving as a waveguide.

4. The communication device according to claim 3, wherein the circuit resides on a flip chip mounted to the substrate.

5. The communication device according to claim 3, further comprising a transceiver circuit residing on the substrate that transmits and receives energy to and from the dielectric insulator serving as a waveguide.

6. The communication device according to claim 5, wherein the circuit resides on a flip chip mounted to the substrate.

7. A communication device, comprising:
   a coaxial cable having length and first and second ends;
   the coaxial cable further having a central conductor, a dielectric insulator surrounding the central conductor, and an electric shield conductor surrounding the dielectric insulator;
   the dielectric insulator serving as a dielectric waveguide having a characteristic impedance Z at an operating frequency range;
   a termination for electrical energy coupled into or out of the dielectric insulator at approximately the characteristic impedance Z at the operating frequency range to utilize the dielectric insulator as a waveguide for transmission of signals along the length of the coaxial cable; and
   wherein the termination comprises a transceiver termination at the first end of the coaxial cable that receives transmitted signals from a transmitter for transmission over the dielectric insulator acting as a waveguide and transmits signals over the dielectric insulator acting as a waveguide;
   wherein the central conductor is further used to communicate an electrical signal between the first and second ends; and
   a transmitter coupled to the central conductor that simultaneously transmits signals to a receiver at the operating frequency range of the coaxial cable using the coaxial cable as a conventional coaxial transmission medium.

8. The communication device according to claim 7, wherein the termination comprises a receiver termination at the second end of the coaxial cable that delivers transmitted signals to a receiver, where such transmitted signals are transmitted over the dielectric insulator acting as a waveguide.

9. A communication device, comprising:
   a coaxial cable having length and first and second ends;
   the coaxial cable further having a central conductor, a dielectric insulator surrounding the central conductor, and an electric shield conductor surrounding the dielectric insulator;
   the dielectric insulator serving as a dielectric waveguide having a characteristic impedance Z at an operating frequency range;
   a termination for electrical energy coupled into or out of the dielectric insulator at approximately the characteristic impedance Z at the operating frequency range to utilize the dielectric insulator as a waveguide for transmission of a first set of transmitted signals along the length of the coaxial cable, where the termination is not the central conductor; and
   wherein the central conductor is utilized to communicate a second set of transmitted signals between the first and second ends, with the first and second set of transmitted signals being communicated simultaneously;
   wherein the termination comprises a transmitter termination at the first end of the coaxial cable that receives the first set of transmitted signals from a transmitter for transmission over the dielectric insulator acting as a waveguide; and wherein the termination comprises a receiver termination at the second end of the coaxial cable that delivers the first set of transmitted signals from the transmitter to a receiver over the dielectric insulator acting as a waveguide; and further comprising a transmitter coupled to the center conductor that simultaneously transmits the second set of transmitted signals to a receiver at the operating frequency range of the coaxial cable using the coaxial cable as a conventional coaxial transmission medium.

10. The communication device according to claim 9, wherein the termination comprises a receiver termination at the second end of the coaxial cable that delivers the first set of transmitted signals to a receiver, where such transmitted signals are transmitted over the dielectric insulator acting as a waveguide.

11. The communication device according to claim 9, further comprising a transmitter coupled to the central conductor that simultaneously transmits the second set of transmitted signals to a receiver at the operating frequency range of the coaxial cable using the coaxial cable as a conventional coaxial transmission medium.

12. The communication device according to claim 9, wherein the termination comprises one or more conductive pads that contact the dielectric insulator of the coaxial cable, wherein energy is passed to or from the one or more conductive pads to provide an interface for use of the coaxial cable's dielectric insulator as a waveguide.

13. The communication device according to claim 12, wherein the conductive pads are formed on the surface of an insulating substrate, and wherein the substrate provides a contact for connecting to the coaxial cable's electric shield and central conductor.

14. The communication device according to claim 12, further comprising a circuit residing on the substrate that transmits or receives the energy from the dielectric insulator serving as a waveguide.

15. The communication device according to claim 14, wherein the circuit resides on a flip chip mounted to the substrate.

16. The communication device according to claim 12, further comprising a transceiver circuit residing on the substrate that transmits and receives energy to and from the dielectric insulator serving as a waveguide.

17. The communication device according to claim 16, wherein the circuit resides on a flip chip mounted to the substrate.

18. A communication device, comprising:
a coaxial cable having length and first and second ends;
the coaxial cable further having a central conductor, a dielectric insulator surrounding the central conductor, and an electric shield conductor surrounding the dielectric insulator;
the dielectric insulator serving as a dielectric waveguide having a characteristic impedance Z at an operating frequency range;
a termination for electrical energy coupled into or out of the dielectric insulator at approximately the characteristic impedance Z at the operating frequency range to utilize the dielectric insulator as a waveguide for transmission of first signals along the length of the coaxial cable, where the termination is not the central conductor; and
wherein the central conductor is further used to communicate a second signal between the first and second ends;
wherein the termination comprises a transmitter termination at the first end of the coaxial cable that receives the first signals from a transmitter for transmission over the dielectric insulator acting as a waveguide, and wherein the termination comprises a receiver termination at the second end of the coaxial cable that delivers the first signals from the transmitter to a receiver over the dielectric insulator acting as a waveguide; and further comprising a transmitter coupled to the central conductor that simultaneously transmits second signals to a receiver at the operating frequency range of the coaxial cable using the coaxial cable as a conventional coaxial transmission medium.

19. The communication device according to claim 18, wherein the termination comprises one or more conductive pads that contact the dielectric insulator of the coaxial cable, wherein energy is passed to or from the one or more conductive pads to provide an interface for use of the coaxial cable's dielectric insulator as a waveguide; and wherein the conductive pads are formed on the surface of an insulating substrate, and wherein the substrate provides a contact for connecting to the coaxial cable's electric shield and central conductor.

20. The communication device according to claim 19, further comprising a circuit residing on the substrate that transmits or receives the energy from the dielectric insulator serving as a waveguide.

21. A communication device, comprising:
a coaxial cable having length and first and second ends;
the coaxial cable further having a central conductor, a dielectric insulator surrounding the central conductor, and an electric shield conductor surrounding the dielectric insulator;
the dielectric insulator serving as a dielectric waveguide having a characteristic impedance Z at an operating frequency range;
a termination for electrical energy coupled into or out of the dielectric insulator at approximately the characteristic impedance Z at the operating frequency range to utilize the dielectric insulator as a waveguide for transmission of first signals along the length of the coaxial cable, where the termination is not the central conductor; and
wherein the termination comprises a transceiver termination at the first end of the coaxial cable that receives transmitted first signals from a transmitter for transmission over the dielectric insulator acting as a waveguide and transmits signals over the dielectric insulator acting as a waveguide; and
wherein the central conductor is further used to communicate a second signal between the first and second ends; and
further comprising a transmitter coupled to the center conductor that simultaneously transmits the second signals to a receiver at the operating frequency range of the coaxial cable using the coaxial cable as a conventional coaxial transmission medium.

22. The communication device according to claim 21, wherein the termination comprises a receiver termination at the second end of the coaxial cable that delivers the transmitted first signals to a receiver, where such transmitted signals are transmitted over the dielectric insulator acting as a waveguide.

23. A communication device, comprising:
a coaxial cable having length and first and second ends;
the coaxial cable further having a central conductor, a dielectric insulator surrounding the central conductor, and an electric shield conductor surrounding the dielectric insulator;
the dielectric insulator serving as a dielectric waveguide having a characteristic impedance Z at an operating frequency range;

a termination for electrical energy coupled into or out of the dielectric insulator at approximately the characteristic impedance Z at the operating frequency range to utilize the dielectric insulator as a waveguide for transmission of signals along the length of the coaxial cable;

wherein the central conductor is further used to communicate an electrical signal between the first and second ends;

wherein the termination comprises a transmitter termination at the first end of the coaxial cable that receives transmitted signals from a transmitter for transmission over the dielectric insulator acting as a waveguide;

wherein the termination comprises a receiver termination at the second end of the coaxial cable that delivers transmitted signals from the transmitter to a receiver over the dielectric insulator acting as a waveguide; and a transmitter coupled to the center conductor that simultaneously transmits signals to a receiver at the operating frequency range of the coaxial cable using the coaxial cable as a conventional coaxial transmission medium.

24. The communication device according to claim 23, wherein the termination comprises a receiver termination at the second end of the coaxial cable that delivers transmitted signals to a receiver, where such transmitted signals are transmitted over the dielectric insulator acting as a waveguide.

25. The communication device according to claim 23, further comprising a transmitter coupled to the central conductor that simultaneously transmits signals to a receiver at the operating frequency range of the coaxial cable using the coaxial cable as a conventional coaxial transmission medium.

26. A communication device, comprising:
a coaxial cable having length and first and second ends;
the coaxial cable further having a central conductor, a dielectric insulator surrounding the central conductor, and an electric shield conductor surrounding the dielectric insulator;

the dielectric insulator serving as a dielectric waveguide having a characteristic impedance Z at an operating frequency range;

a termination for electrical energy coupled into or out of the dielectric insulator at approximately the characteristic impedance Z at the operating frequency range to utilize the dielectric insulator as a waveguide for transmission of signals along the length of the coaxial cable;

wherein the central conductor is further used to communicate an electrical signal between the first and second ends;

wherein the termination comprises a transmitter termination at the first end of the coaxial cable that receives transmitted signals from a transmitter for transmission over the dielectric insulator acting as a waveguide, and wherein the termination comprises a receiver termination at the second end of the coaxial cable that delivers transmitted signals from the transmitter to a receiver over the dielectric insulator acting as a waveguide; and a transmitter coupled to the central conductor that simultaneously transmits signals to a receiver at the operating frequency range of the coaxial cable using the coaxial cable as a conventional coaxial transmission medium.

27. The communication device according to claim 26, wherein the termination comprises one or more conductive pads that contact the dielectric insulator of the coaxial cable, wherein energy is passed to or from the one or more conductive pads to provide an interface for use of the coaxial cable's dielectric insulator as a waveguide; and wherein the conductive pads are formed on the surface of an insulating substrate, and wherein the substrate provides a contact for connecting to the coaxial cable's electric shield and central conductor.

28. The communication device according to claim 27, further comprising a circuit residing on the substrate that transmits or receives the energy from the dielectric insulator serving as a waveguide.

* * * * *